(12) United States Patent
Pack (10) Patent No.: US 8,903,644 B2
(45) Date of Patent: Dec. 2, 2014

(54) DIGEST FOR LOCALIZATION OR FINGERPRINTED OVERLAY

(71) Applicant: iRobot Corporation, Bedford, MA (US)

(72) Inventor: Robert Todd Pack, Nashua, NH (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/688,933

(22) Filed: Nov. 29, 2012

(65) Prior Publication Data

US 2013/0138337 A1 May 30, 2013

Related U.S. Application Data (60) Provisional application No. 61/564,586, filed on Nov. 29, 2011.

(51) Int. Cl.
 *G01S 1/24* (2006.01)
 *G01C 21/00* (2006.01)
 *G05D 1/02* (2006.01)

(52) U.S. Cl.
 CPC .............. *G01C 21/00* (2013.01); *G05D 1/0251* (2013.01); *G05D 1/0278* (2013.01); *G05D 1/0274* (2013.01); *G05D 2201/0209* (2013.01); *G05D 1/024* (2013.01); *G05D 1/027* (2013.01)
 USPC ........................................................ 701/409

(58) Field of Classification Search
 None
 See application file for complete search history.

(56) References Cited

U.S. PATENT DOCUMENTS 8,306,738 B2 * 11/2012 Kong et al. ................... 701/411
2011/0054689 A1 * 3/2011 Nielsen et al. ................ 700/258

* cited by examiner

*Primary Examiner* — Behrang Badii
*Assistant Examiner* — Michael D Lang
(74) *Attorney, Agent, or Firm* — Honigman Miller Schwartz and Cohn LLP (57) ABSTRACT

A method for mapping an environment proximal to a vehicle includes obtaining a current location of the vehicle according to a map of the environment, detecting at least one characteristic of the environment at the current location, and storing the at least one characteristic in a characteristic digest. The characteristic digest respectively associates one or more locations in the environment to one or more sets of previously detected characteristics in the environment. The method also includes associating the at least one characteristic with the current location in the characteristic digest.

20 Claims, 6 Drawing Sheets

DIGEST FOR LOCALIZATION OR FINGERPRINTED OVERLAY

CROSS REFERENCE TO RELATED APPLICATIONS

This U.S. patent application claims priority under 35 U.S.C. §119(e) to U.S. Provisional Application 61/564,586 filed on Nov. 29, 2011, which is hereby incorporated by reference in its entirety.

TECHNICAL FIELD

This disclosure relates to sensing an environment proximal to a remote vehicle and mapping the sensed information into a digest associated with a coordinate-based map.

BACKGROUND

Remote vehicles are increasingly being used in military operations for tasks such as ordnance or explosives handling or disposal, field reconnaissance, terrain mapping, and various other procedures. These remote vehicles are commonly equipped with various devices for sensing environmental information, including video cameras, and have been used to scout hostile positions in urban and non-urban environments.

Aerial, satellite, and short range reconnaissance may provide valuable information to enhance the usefulness of remote vehicles by providing location and mapping information for both controlled and autonomous operation. However, such reconnaissance may only provide limited information regarding certain characteristics of the proximal environment, and particularly, areas around and under the remote vehicle. Accurate and up-to-date information of the vehicle's proximal environment may allow the vehicle to maneuver through the environment safely and reliably, and thus, may enhance its ability to successfully accomplish either operator-controlled or autonomous high-level goals.

SUMMARY

One aspect of the disclosure provides a method for mapping an environment proximal to a vehicle. The method includes obtaining a current location of the vehicle according to a map of the environment, detecting at least one characteristic of the environment at the current location, and storing the at least one characteristic in a characteristic digest. The characteristic digest respectively associates one or more locations in the environment to one or more sets of previously detected characteristics in the environment. The method also includes associating the at least one characteristic with the current location in the characteristic digest.

Implementations of the disclosure may include one or more of the following features. In some implementations, the characteristic includes an acceleration of the vehicle at the current location when the vehicle is in a rest mode. The acceleration may be received from an inertial measurement unit of the vehicle. In some examples, the characteristic includes a slope of a terrain beneath the vehicle, a roughness of the terrain beneath the vehicle, and/or a friction coefficient of the terrain under the vehicle.

The method may include detecting additional information at the current location, storing the additional information in the characteristic digest, and associating the additional information with the current location. The additional information may include short-range communication protocol information, which may be indicative of whether communication performed using a specific communication protocol can be performed at the current location.

In some implementations, the characteristic includes at least one of a magnitude of a magnetic field detected at the current location, an amount of visible light detected at the current location, an amount of invisible light detected at the current location, an amount of sound detected at the current location, a temperature detected at the current location, or a humidity detected at the current location. A global positioning system unit of the vehicle may determine the current location, and the current location is indicative of global positioning coordinates of the vehicle. In some examples, a simultaneous localization and mapping system of the vehicle determines the current location, and the current location is indicative of simultaneous localization and mapping coordinates of the vehicle.

Another aspect of the disclosure provides a method for verifying mapping information of an environment proximal to a vehicle. The method includes determining a current location of the vehicle according to a map of the environment, detecting at least one characteristic of the environment at the current location, and obtaining at least one previously detected characteristic from a characteristic digest based on the current location. The characteristic digest respectively associates one or more locations in the environment to one or more sets of previously detected characteristics in the environment. The method also includes comparing the at least one previously detected characteristic with the at least one characteristic and determining an accuracy of the determined current location based on the comparing.

In some implementations, the method includes determining, for each of the at least one previously detected characteristics, a probability of the previously detected characteristic, the probability being indicative of a likelihood that a value of the characteristic varies over a duration of time. The at least one characteristic may include at least one of a slope of a terrain beneath the vehicle, a roughness of the terrain below the vehicle, or a friction coefficient of the terrain beneath the vehicle. Additionally or alternatively, the at least one characteristic may include at least one of a magnetic field detected at the current location, an amount of visible light detected at the current location, an amount of invisible light detected at the current location, an amount of sound detected at the current location, a temperature detected at the current location, or a humidity detected at the current location In yet another aspect of the disclosure, a remote vehicle includes a navigation system configured to determine a current location of the remote vehicle, a sensor system configured to detect at least one characteristic of the current location of the robot, and a memory device configured to store a map of an environment of the remote vehicle and a characteristic digest. The characteristic digest respectively associates one or more locations in the environment to one or more sets of previously detected characteristics in the environment. The remote vehicle also includes a processing device logically coupled to the navigation system, the memory device, and the sensor system. The processing device is configured to obtain a current location of the vehicle according to a map of the environment, detect at least one characteristic of the environment at the current location, store the at least one characteristic in a characteristic digest, and associate the at least one characteristic with the current location in the characteristic digest.

In some implementations, the characteristic includes an acceleration of the vehicle at the current location when the vehicle is in a rest mode. The acceleration is received from an inertial measurement unit of the vehicle. The characteristic may include a slope of a terrain beneath the vehicle, a roughness of the terrain beneath the vehicle, and/or a friction coefficient of the terrain under the vehicle.

The processing device may be configured to detect additional information at the current location, store the additional information in the characteristic digest, and associate the additional information with the current location. The additional information may include short-range communication protocol information, which may be indicative of whether communication performed using a specific communication protocol can be performed at the current location.

In some examples, the characteristic includes at least one of a magnitude of a magnetic field detected at the current location, an amount of visible light detected at the current location, an amount of invisible light detected at the current location, an amount of sound detected at the current location, a temperature detected at the current location, or a humidity detected at the current location.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The present disclosure relates to sensing an environment proximal to a remote vehicle and mapping the sensed information into a digest associated with a coordinate-based map. The present disclosure is not limited to a specific type of remote vehicle or by specific types of characteristics of the proximal environment.

Figure 1:
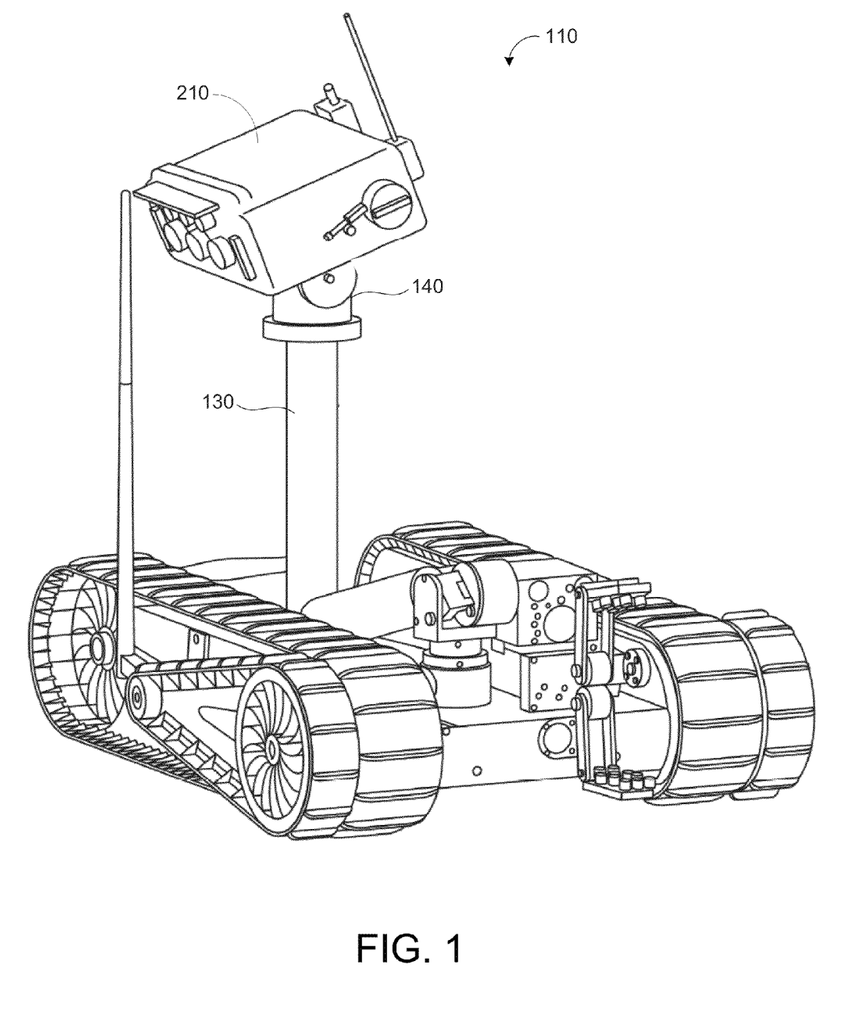
FIG. 1 is a plan view of an exemplary remote vehicle.

FIG. 1 illustrates an exemplary implementation of a remote vehicle 110. As used herein, the term "remote vehicle" can refer to a vehicle that can be controlled by a remote operator and/or a control unit. One example of a remote vehicle 110 is a robot. A remote vehicle 110 can include environment sensors such as, a laser range finder, a stereo vision camera, a Global Positioning System (GPS), a planar laser-based Simultaneous Localization and Mapping (SLAM) system, and/or an Inertial Measurement Unit (IMU). Remote vehicles can be completely autonomous, finding and recognizing tangible elements within their immediate environment, or an operator with an operator control unit (OCU) can identify tangible elements through sensor systems such as the ones listed above and in U.S. patent application Ser. No. 13/106, 792, filed May 12, 2011, titled Remote Vehicle Control System and Method, the content of which is hereby incorporated by reference in its entirety. A tangible element can include, for example, an object of various sizes, shapes, textures, physical constitutions, and weights.

An environment can be defined as a physical area that has a defined coordinate system with a localization strategy and a planning strategy, each of which is effective for its environment. For example, an outdoor environment may include a GPS-based coordinate system with a waypoint planning path strategy and GPS-based localization. An indoor environment may include a planar laser-based SLAM strategy to define its coordinate system, and can utilize path planning. Other environments can use, for example, a 3-Dimensional (3D) volumetric picture element (VOXEL)-based representation of an area based on stereo-vision information of the area, a 3D-based SLAM, or SLAM for a predetermined remote vehicle sensor.

Figure 2:
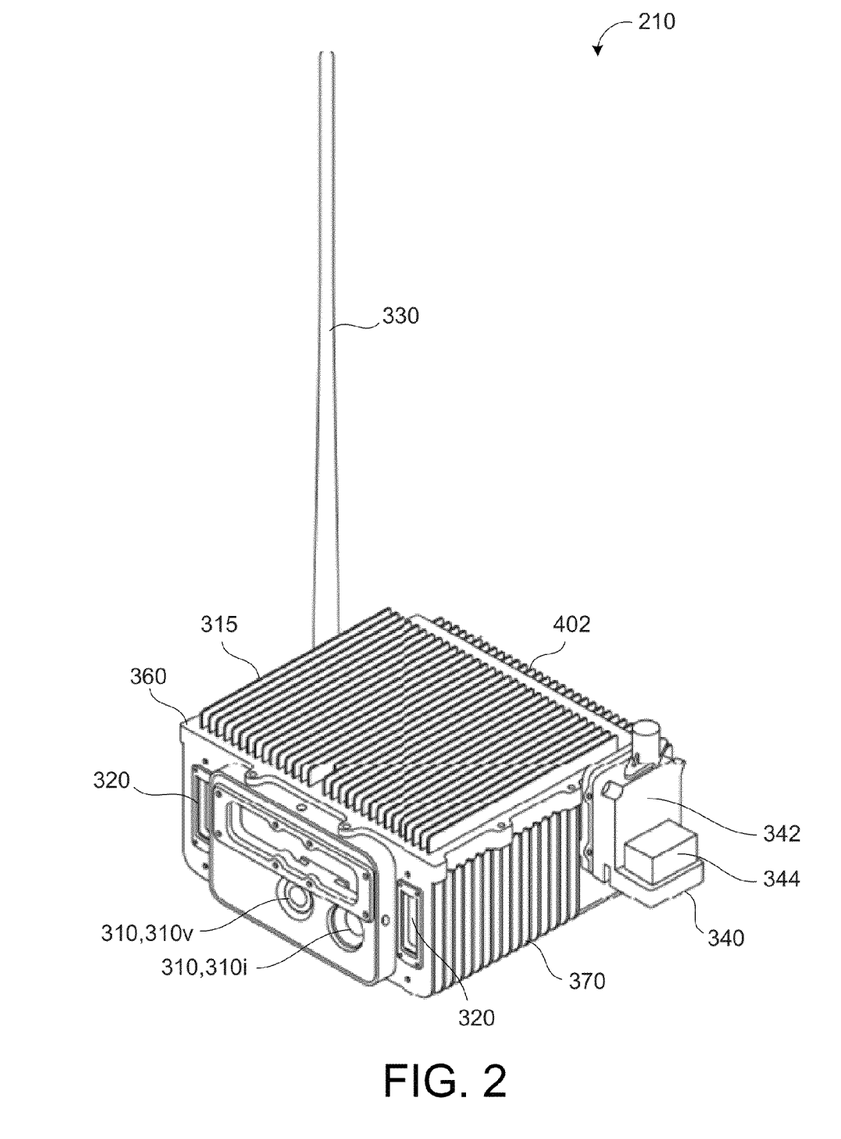
FIG. 2 is a plan view of an exemplary payload of the remote vehicle of FIG. 1.
Figure 3:
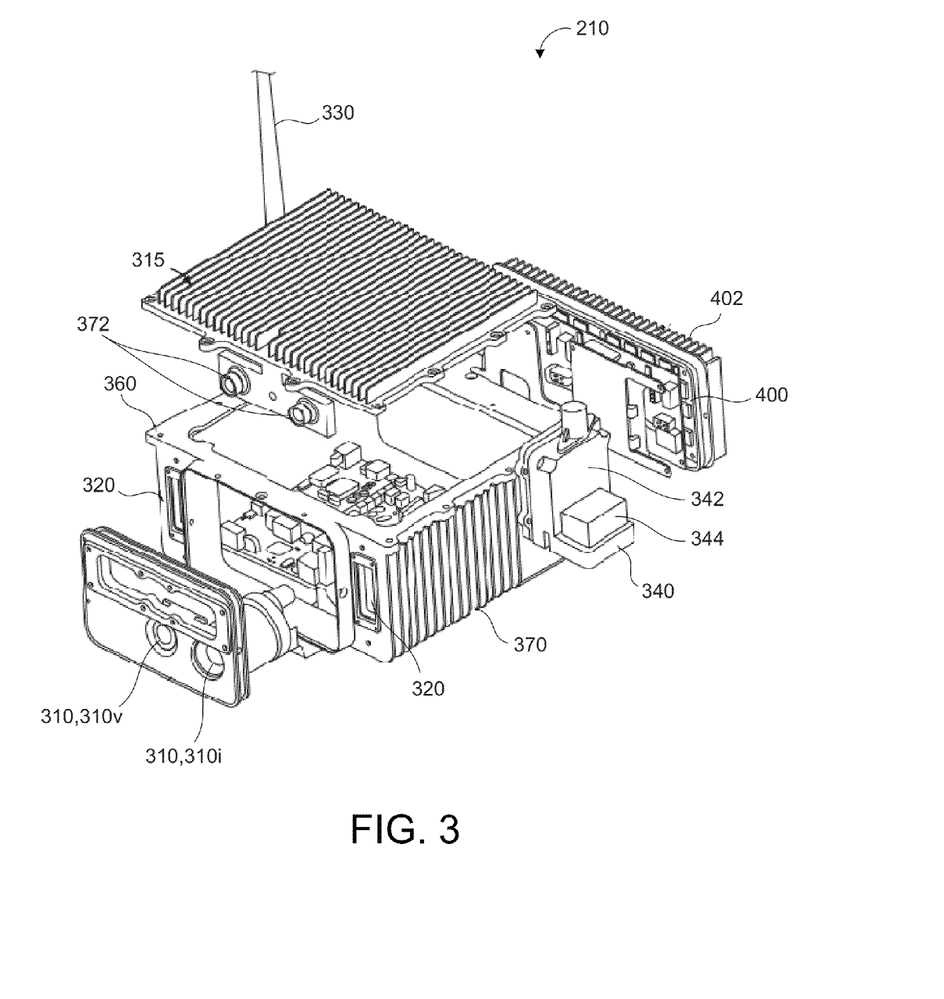
FIG. 3 is an exploded view of the payload of FIG. 2.

In some implementations, the remote vehicle 110 includes a payload 210, which may be attached to the remote vehicle using a mast 130 and a pan/tilt mechanism 140. The payload 210 may include an inertial navigation system that includes a global positioning system (GPS) unit and an inertial measurement unit (IMU) with localization algorithms. A modular computational subsystem may also be provided in the payload 210, and may include an integrated passive thermal heat sink FIGS. 2 and 3 depict a plan view of a payload 210 and an exploded view of the payload 210, respectively. An exemplary payload 210 is described in greater detail in U.S. patent application Ser. No. 13/106,792, filed May 12, 2011, titled "Remote Vehicle Control System and Method," the content of which is hereby incorporated by reference in its entirety. In the illustrated implementation, the payload includes a camera 310, an illumination unit 320, a depth sensor 315, at least one radio frequency (RF) antenna 330, a navigation system 340, a controller 400, a sealed enclosure 360, and a main housing 370. The payload 210 may include additional components not shown or directly referenced in FIGS. 2 and 3.

The camera 310 can be a visible camera 310v or an infrared (IR) camera 310i. While one camera 310 is shown, the remote vehicle 110 may include more than one camera 310. The camera 310 can provide spectral data and material differentiation. The camera 310 may operate in low-light environments and/or in environments. The illumination unit 320 may provide IR illumination and/or visible illumination in a field of view of the camera 310. Visible illumination can include "textured" illumination when stereo vision is employed.

The depth sensor 315 can provide two-dimensional range/depth sensing. In some implementations, the depth sensor 315 is a stereo vision system and/or a laser range finder to determine a distance separating a remote object and the payload 210. The depth sensor 315 may implement Light Detection and Ranging (LIDAR) optical sensing techniques to determine the distance separating an object detected in a field of view of the camera 310 and the payload 210.

The RF antenna 330 receives RF signals from one or more remote devices. The RF signals may be provided to an integrated RF unit (not shown). In this way, a remote device may transmit control signals to the payload. For instance, the remote device may transmit control signals received by the RF antenna 330 that indicate commands for controlling the remote vehicle 110. The integrated RF unit may receive the commands and may cause at least one component of the remote vehicle 110 to operate in a manner indicated by the commands.

The navigation system 340 may include a global positioning system (GPS) unit 342 and an inertial measurement unit (IMU) 344 with localization algorithms. The navigation system 340 can determine a geospatial location of the remote vehicle 110 based on the GPS unit 342 and/or the IMU 344. For example, the GPS unit 342 may determine the GPS coordinates of the payload 210 by receiving signals from three or more GPS satellites and performing known triangulation techniques. The IMU 344 may output inertial signals that are indicative of an acceleration of the remote vehicle 110. For example, the inertial signals can be indicative of a magnitude of the acceleration and a direction of the acceleration. Furthermore, in some implementations, the GPS coordinates determined by the GPS unit 342 may be fine-tuned using the output from the IMU 344 by performing dead-reckoning techniques. In some implementations, the inertial navigation system 340 is configured to execute one or more localization algorithms. It is noted that while GPS coordinates are described, the navigation system 340 may determine other types of coordinates, including but not limited to, SLAM coordinates.

The controller 400 may also be included in the payload 210, for example, as a modular computational subsystem. The controller 400 may include an integrated passive thermal heat sink 402.

The components of the payload 210 may be housed in the sealed rugged enclosure 360. The sealed rugged enclosure 360 may be constructed to protect the components from external environmental conditions. Furthermore, the main housing 370 may include one or more expansion ports 372. The expansion ports 372 can receive connectors or input from other devices or modules. For example, the expansion ports 372 may receive input from a specific type of sensor not originally included in the payload 210.

While FIGS. 1-3 illustrate an example of a payload 210, it is noted that other configurations of the payload 210 are contemplated and are within the scope of the disclosure. For example, a payload 210 consistent with the present disclosure may be configured to include other scanning/sensing technology for scanning/sensing the environment proximal to the remote vehicle without departing from the spirit of the present teachings.

Figure 4:
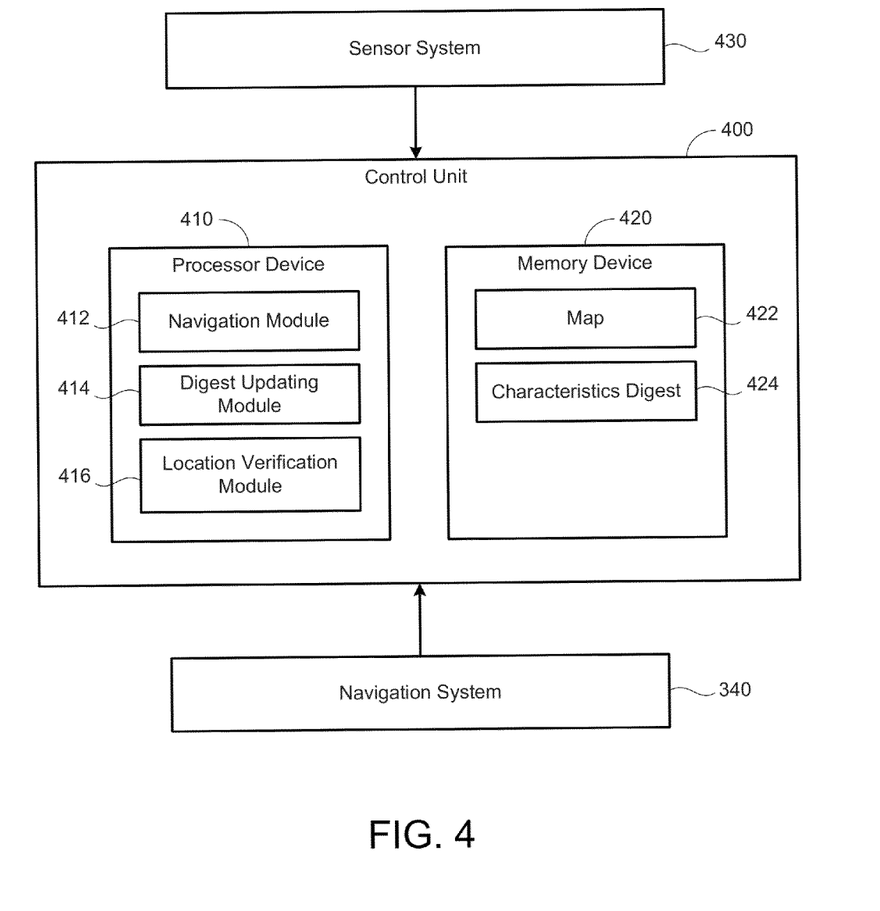
FIG. 4 is a schematic view of a controller of the remote vehicle of FIG. 1.

Referring now to FIG. 4, the exemplary remote vehicle 110 illustrated in FIGS. 1-3 is configured to gather information from its proximal environment to complement an existing grid map 422 of the environment. In some implementations, the remote vehicle 110 detects one or more characteristics of the proximal environment and stores the one or more characteristics in a characteristic digest 424, such that the one or more characteristics are associated with the location at which the characteristics were detected. As used herein, the term "characteristic" can refer to a physical state or condition of the environment at a particular location. Examples of characteristics of a particular location can include, but are not limited to, a slope of a terrain at the particular location, a roughness of the terrain at the particular location, a friction coefficient of the terrain at the particular location, a magnitude of a magnetic field detected at the particular location, an amount of visible light detected at the particular location, an amount of invisible light detected at the particular location, an amount of sound detected at the particular location, a temperature detected at the particular location, and a humidity detected at the particular location. The foregoing examples of characteristics are not intended to be limiting.

As used herein, the "characteristic digest" can be any table or any suitable structure that relates one or more locations to one or more sets of characteristics. In some implementations, the characteristic digest 424 may be a hash table that receives locations as the keys and outputs sets of characteristics corresponding to the locations. For example, the characteristic digest 424 may relate a location, (X, Y), to a set of characteristics, {a, b, c}, where X is first coordinate, Y is a second coordinate, a is a first characteristic detected at the location (X, b is a second characteristic detected at the location (X,Y), and c is a third characteristic detected at the location (X,Y). In response to receiving a location, (X, Y), the characteristic digest 424 can output the set of characteristics, {a, b, c}. In this way, the remote vehicle 110 can reference upcoming locations in its path to determine the characteristics that have been previously detected at the upcoming location.

It is noted that while the characteristic digest 424 is explained as relating characteristics to locations, the characteristic digest 424 may be further configured to relate other information to the locations. For instance, the characteristic digest 424 may store network capabilities that indicate whether communication performed according to a specific communication protocol can be performed at a particular location. In such implementations, the characteristic digest 424, in response to a requested location, can return the characteristics corresponding to the requested location as well as the other information corresponding to the requested location.

FIG. 4 provides a schematic illustrating an exemplary controller 400 of the remote vehicle 110. In some implementations, the controller 400 is included in the payload 210, as illustrated in FIG. 3. The controller 400 may control operation of the remote vehicle 110. For example, the controller 400 can control the movement of the remote vehicle 110. In the illustrated implementation, the controller 400 can include, but is not limited to, a processing device 410 and a memory device 420 (e.g., non-transitory memory, flash memory, random access memory (RAM), dynamic random access memory (DRAM), phase change memory (PCM), and/or disks). The memory device 420 can store the map 422 of an environment and the characteristic digest 424 corresponding to the environment. The controller 400 can receive input from a sensor system 430.

The sensor system 430 can include any suitable devices for sensing conditions of the environment proximate to the remote vehicle 110. For instance, the sensor system 430 can include one or more of an ambient temperature sensor, a barometer, a humidity sensor, an accelerometer, and a brake sensor. The devices of the sensor system 430 may be integrated into the payload 210 or may be coupled to the payload 210 via the expansion ports 372 of the main housing 370. Furthermore, the sensor system 430 can include one or more of the elements discussed with respect to FIG. 3, e.g., the camera 310. Depending on the terrain that the remote vehicle 110 is intended to traverse or the conditions in which the remote vehicle is intended to operate in, the devices that are included in the sensor system 430 may vary.

The processing device 410 can include a computer-readable memory (e.g., non-transitory memory, flash memory, random access memory (RAM), dynamic random access memory (DRAM), phase change memory (PCM), and/or disks) storing computer-readable instructions and one or more processors that execute the computer-readable instructions. In implementations where the processing device 410 includes two or more processors, the processors can execute in an individual or distributed manner. The processing device 410 can execute a navigation module 412, a digest updating module 414, and a location verification module 416.

The navigation module 412 retrieves the map 422 of the environment from the memory device 420 and determines a current location of the remote vehicle based on the map. The navigation module 412 can utilize input received from the navigation system 340 to assist in the determination of the current location. In some implementations, the navigation module 412 can further utilize the map 422 to determine a route to travel. In these implementations, the navigation module 412 can retrieve characteristics associated with one or more upcoming locations in the route from the characteristic digest 424. For example, the navigation module 412 can provide an upcoming location to the characteristic digest and determine a slope of the terrain at the upcoming location or the friction coefficient of the terrain at the upcoming location. In implementations where the characteristic digest 424 stores and returns additional information, the navigation module 412 may determine whether communication performed according to a specific communication protocol can be performed at the upcoming location.

The digest updating module 414 updates the characteristic digest 424 to reflect characteristics detected at a current location. The digest updating module 414 can receive the characteristics from various sources, including the sensor system 430. Further, the digest updating module 414 can receive a current location of the remote vehicle 110 from, for example, the navigation module 412. The digest updating module 414 can store the characteristics in the characteristic digest 424 and can associate the characteristics with a value corresponding to the current location. In some implementations, the digest updating module 414 can further store other information corresponding to the current location in the characteristic digest 424 and can associate the other information with the value corresponding to the current location. For example, in implementations where the digest is a hash table, the digest updating module 414 can store the characteristics and, optionally, the other information in an entry of the hash table that corresponds to a key value corresponding to the current location.

Figure 5:
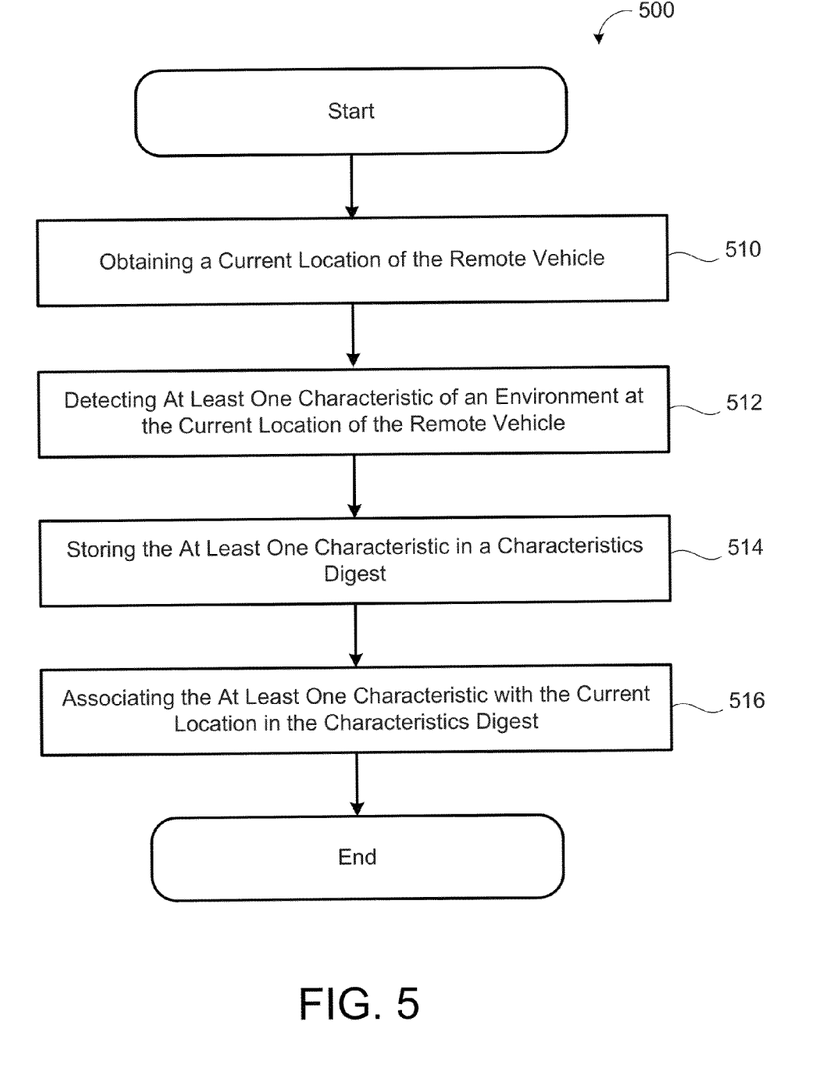
FIG. 5 provides an exemplary arrangement of operations for a method of mapping an environment of the remote vehicle.

Referring now to FIG. 5, an example method 500 for mapping an environment of the remote vehicle 110 is illustrated. For purposes of explanation, the method 500 is explained as being performed by the digest updating module 414. It is noted that the method 500 may be performed by another component of the remote vehicle 110.

At operation 510, the digest updating module 414 obtains a current location of the remote vehicle 110. In some implementations, the digest updating module 414 receives the current location of the remote vehicle 110 from the navigation module 412. As previously discussed, the navigation module 412 can determine the current location of the remote vehicle 110 from a map 422 of the environment and the navigation system 340. The current location can be represented in, for example, GPS coordinates or SLAM coordinates. In some implementations, the digest updating module 414 can further obtain a current time, which corresponds to the time at which the current location is determined.

At operation 512, the digest updating module 414 detects one or more characteristics of the environment at the current location. The digest updating module 414 can detect the characteristics based on input from the sensor system 430. For example, the digest updating module 414 can detect a slope of the terrain beneath the remote vehicle 110 based on output from an accelerometer and can detect a temperature at the current location based on the output from an ambient temperature sensor. Furthermore, according to some implementations, the digest updating module 414 can detect other information, such as the network capabilities at the current location, e.g., whether communication can be performed according to a specific protocol, e.g., Bluetooth or the IEEE 802.11 short-range communication protocol (WiFi).

At operation 514, the digest updating module 414 stores the characteristics, and optionally, the other information in the characteristic digest 424. Furthermore, for each characteristic, the digest updating module 414 can store a probability indicating a likelihood that the characteristic will vary over a duration of time. For example, the slope of a terrain is unlikely to vary over time. Thus, the probability corresponding to the slope of the terrain may be relatively low, e.g., less than 0.1%. Conversely, the temperature of the environment is likely to vary over time. Accordingly, the probability corresponding to the temperature may be relatively high, e.g., greater than 70%. At operation 516, the digest updating module 414 associates the characteristics in the characteristics digest with the current location. As discussed above, a value indicating the current location can be used as a key to obtain the characteristics corresponding to the current location. In this way, the characteristics corresponding to the current location (and in some implementations, a probability of each characteristic) can be determined using a location corresponding to the current location.

In implementing the method 500, the digest updating module 414 may enhance location information in the map 422 by including characteristics at one or more locations at different times in the characteristic digest 424. This information may be analyzed and used in the future to disambiguate the environment when creating and localizing in maps. For example, the information may be used to verify coordinates locations of the remote vehicle (e.g., cross-checking present characteristics with characteristics stored in a corresponding digest) or anticipate characteristics of an environment and act/behave accordingly (e.g., transitions between environments like thresholds, bumps, carpet edges, etc.).

As a further example, location coordinates may only provide a location on the map 422 but may not indicate whether the location includes a particular attribute, e.g., a sloped surface on which the remote vehicle 110 will operate. If a remote vehicle 110 is controlled to stop at a sloped location, the remote vehicle 110 may roll down the slope upon stopping. If the remote vehicle 110 is aware of the slope, however, it may apply its brakes while in the stopped position.

The method 500 of FIG. 5 is provided for illustrative purposes. The method 500 may include additional operations. Furthermore, variations of the method 500 are contemplated and are within the scope of the disclosure.

Referring back to FIG. 4, the location verification module 416 obtains previously detected characteristics from the characteristic digest 424 in order to verify a current location received from the navigation module 412. The location verification module 416 obtains characteristics corresponding to the current location and compares the characteristics with the previously detected characteristics corresponding to the current location. For example, the location verification module 416 may detect a first friction coefficient, $\mu_1$, at the current location and may obtain a second friction coefficient, $\mu_2$, from the characteristics digest 424 using the current location. If the first friction coefficient matches, or approximately matches, the second coefficient, the location verification module 416 can verify the accuracy of the current location provided by the navigation module 412. If the first and second coefficients do not match, however, the location verification module 416 can provide a notification to the navigation module 412 indicating that the current location provided by the navigation module 412 is unable to be verified as being accurate. Furthermore, in some implementations, the location verification module 416 utilizes the probability associated with each particular characteristic to determine whether the particular characteristic is suitable for comparison. For example, characteristics having probabilities falling below a threshold, e.g., the probability associated with temperature or humidity, may be unsuitable for the comparison, while characteristics having probabilities above the threshold, e.g., the probability associated with slope or roughness of a terrain, may be suitable for the comparison.

Figure 6:
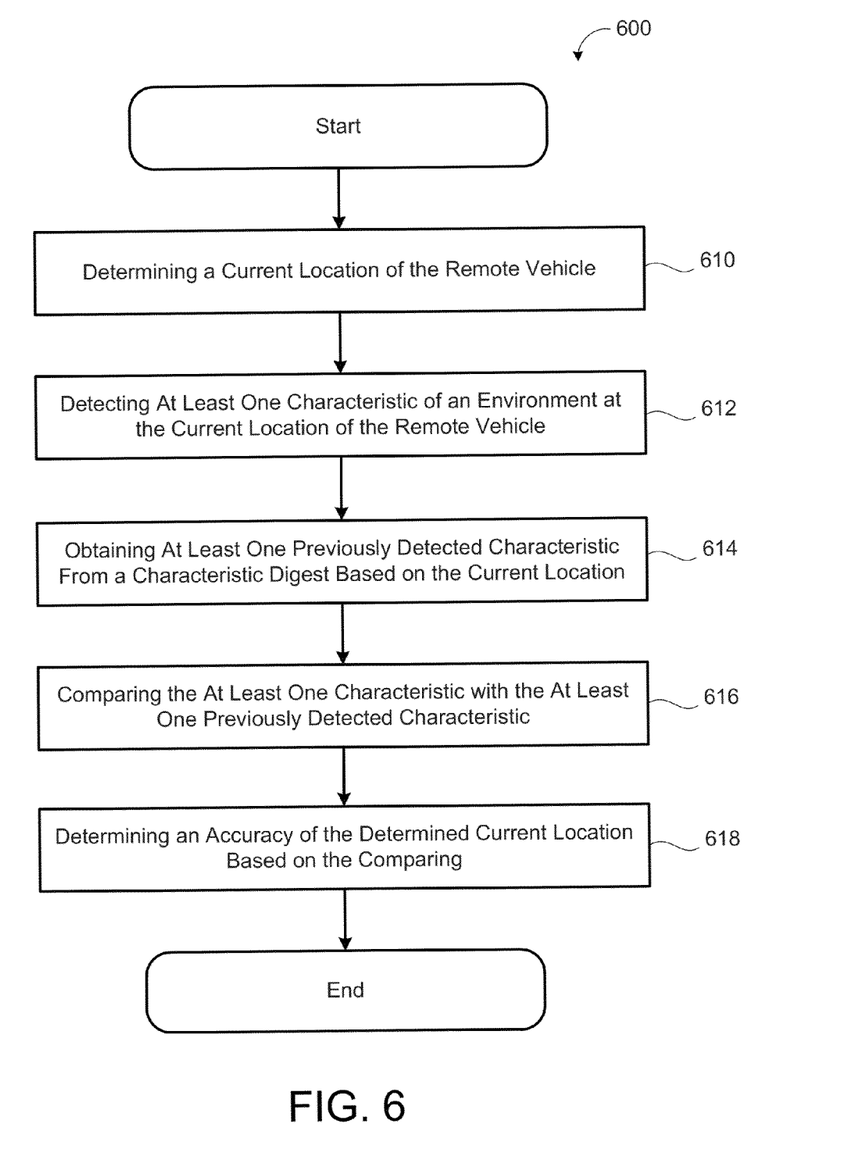
FIG. 6 provides an exemplary arrangement of operations for a method of verifying a location of a remote vehicle.

Referring now to FIG. 6, an example method 600 for verifying a location of the remote vehicle 110 is illustrated. For purposes of explanation, the method 600 is explained as being performed by the location verification module 416. It is noted that the method 600 may be performed by another component of the remote vehicle 110.

At operation 610, the location verification module 416 determines a current location of the remote vehicle 110. At operation 612, the location verification module 416 detects at least one characteristic of an environment at the current location. As previously discussed, the characteristics may be received from the sensor system 430.

At operation 614, the location verification module 416 obtains at least one previously detected characteristic from the characteristic digest 424. The location verification module 416 can query the characteristic digest 424 using the current location as the key. In response, the characteristic digest 424 can return characteristics that were previously detected at a location corresponding to the current location.

At operation 616, the location verification module 416 compares the at least one characteristic with the at least one previously detected characteristic. As discussed above, the location verification module 416 can determine whether a probability, associated with a particular characteristic makes the particular characteristic suitable for the comparison before making the comparison. For example, when a characteristic is one expected to be constant or substantially constant within a period of time (e.g., slope under the vehicle), and/or the characteristic is considered relatively unique (positive slope within a predominantly flat area), the probability that a previously recorded measurement may still be valid is very high, and thus, a remote vehicle should reasonably expect a present reading of the characteristic to confirm/corroborate the location of the vehicle provided by a coordinate-based system.

At operation 618, the location verification module 416 determines the accuracy of the current location (determined at operation 610) based on the comparison. For example, if the values of the characteristics and the values of the previously detected characteristics match or approximately match, the location verification module 416 determines that the determined location is likely accurate. If, however, the characteristics and the previously detected characteristics do not match, the determined location is unlikely to be accurate.

The method 600 of FIG. 6 is provided for illustrative purposes. The method 600 may include additional operations. Furthermore, variations of the method 600 are contemplated and are within the scope of the disclosure.

Using the techniques disclosed above, control of the remote vehicle 110 may be improved when using a map 422 of an environment. For example, location coordinates of the map 422 may only provide a location of the vehicle 110 but may not indicate whether the location is a rough or sloped terrain. As can be appreciated, a rough or sloped terrain may require the remote vehicle 110 to limit its speed. When the remote vehicle 110 is controlled to travel along a path but is not aware of the roughness or slope of the path, the remote vehicle 110 may lose control and/or tip over if the traveling speed is higher or the pose is less stable than what would be appropriate for the remote vehicle 110. If the remote vehicle 110 is aware of the path's roughness and/or slope, however, the remote vehicle 110 may automatically reduce its speed and/or change its pose.

As a further example, the remote vehicle 110 may communicate with a computer network through, for example, the IEEE 80211 short-range communication protocol (WiFi), which the vehicle may use to exchange information with a remote computer. Although known WiFi-accessible locations may be prerecorded in the remote vehicle 110, WiFi networks are easily reconfigurable and/or may be susceptible to unexpected interference. Thus, in implementations where the characteristic digest 424 includes additional information, the remote vehicle 110 may detect available WiFi networks as it travels throughout an area. If the remote vehicle 110 needs to communicate with a remote computer, for example to receive mission information or provide reconnaissance information to a remote location, the remote vehicle 110 may be able to determine a proximate location where an accessible WiFi network is available.

Various implementations of the systems and techniques described here can be realized in digital electronic circuitry, integrated circuitry, specialty designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for mapping an environment proximal to a vehicle, the method comprising:
   while driving about the environment, at least periodically:
      obtaining a current location of the vehicle according to a map of the environment;
      detecting at least one characteristic of the environment at the current location, the at least one characteristic including an acceleration of the vehicle at the current location when the vehicle is in a rest mode, the acceleration being received from an inertial measurement unit of the vehicle;
      storing the at least one characteristic in a characteristic digest, the characteristic digest respectively associating one or more locations in the environment to one or more sets of previously detected characteristics in the environment; and
      associating the at least one characteristic with the current location in the characteristic digest; and
   in response to determining a loss of localization:
      detecting one or more characteristics of the environment;
      comparing the one or more characteristics of the environment with the previously detected characteristics stored in the characteristic digest; and
      estimating a location of the vehicle based on the comparison.

2. The method of claim 1, wherein the at least one characteristic includes a slope of a terrain beneath the vehicle.

3. The method of claim 2, wherein the at least one characteristic further includes a roughness of the terrain beneath the vehicle.

4. The method of claim 2, wherein the at least one characteristic further includes a friction coefficient of the terrain under the vehicle.

5. The method of claim 1, further comprising:
   detecting additional information at the current location;
   storing the additional information in the characteristic digest; and
   associating the additional information with the current location.

6. The method of claim 5, wherein the additional information includes short-range communication protocol information, the short-range communication protocol information being indicative of whether communication performed using a specific communication protocol can be performed at the current location.

7. The method of claim 1, wherein the at least one characteristic includes at least one of a magnitude of a magnetic field detected at the current location, an amount of visible light detected at the current location, an amount of invisible light detected at the current location, an amount of sound detected at the current location, a temperature detected at the current location, or a humidity detected at the current location.

8. The method of claim 1, wherein the current location is determined from a global positioning system unit of the vehicle, and the current location is indicative of global positioning coordinates of the vehicle.

9. The method of claim 1, wherein the current location is determined from a simultaneous localization and mapping system of the vehicle, and the current location is indicative of simultaneous localization and mapping coordinates of the vehicle.

10. A method for verifying mapping information of an environment proximal to a vehicle, the method comprising:
   determining a current location of the vehicle according to a map of the environment;
   detecting at least one current characteristic of the environment at the current location, the at least one characteristic including an acceleration of the vehicle at the current location when the vehicle is in a rest mode, the acceleration being received from an inertial measurement unit of the vehicle;
   obtaining at least one previously detected characteristic from a characteristic digest based on the current location, the characteristic digest respectively associating one or more locations in the environment to one or more sets of previously detected characteristics in the environment;
   comparing the at least one previously detected characteristic with the at least one current characteristic;
   determining an accuracy of the determined current location of the vehicle based on the comparing;
   in response to the current characteristic matching the previously detected characteristic, indicating that the mapping information is accurate; and
   in response to the current characteristic not matching the previously detected characteristic, indicating that the mapping information is inaccurate.

11. The method of claim 10, further comprising determining, for each of the at least one previously detected characteristics, a probability of the previously detected characteristic, the probability being indicative of a likelihood that a value of the characteristic varies over a duration of time.

12. The method of claim 10, wherein the at least one characteristic includes at least one of a slope of a terrain beneath the vehicle, a roughness of the terrain below the vehicle, or a friction coefficient of the terrain beneath the vehicle.

13. The method of claim 10, wherein the at least one characteristic includes at least one of a magnetic field detected at the current location, an amount of visible light detected at the current location, an amount of invisible light detected at the current location, an amount of sound detected at the current location, a temperature detected at the current location, or a humidity detected at the current location.

14. A remote vehicle comprising:
   a navigation system configured to determine a current location of the remote vehicle;
   a sensor system configured to detect at least one characteristic of the current location, the at least one characteristic including an acceleration of the vehicle at the current location when the vehicle is in a rest mode, the acceleration being received from an inertial measurement unit of the vehicle;
   a memory device configured to store a map of an environment of the remote vehicle and a characteristic digest, the characteristic digest respectively associating one or more locations in the environment to one or more sets of previously detected characteristics in the environment; and
   a processing device logically coupled to the navigation system, the memory device, and the sensor system and configured to:
      while the remote vehicle is driving about the environment, at least periodically:
         obtain a current location of the vehicle according to a map of the environment;

detect at least one characteristic of the environment at the current location;

store the at least one characteristic in a characteristic digest; and associate the at least one characteristic with the current location in the characteristic digest; and in response to determining a loss of localization:

detect one or more characteristics of the environment;

compare the one or more characteristics of the environment with the previously detected characteristics stored in the characteristic digest; and estimate a location of the vehicle based on the comparison.

15. The remote vehicle of claim 14, wherein the at least one characteristic includes a slope of a terrain beneath the vehicle.

16. The remote vehicle of claim 14, wherein the at least one characteristic includes a roughness of the terrain beneath the vehicle.

17. The remote vehicle of claim 14, wherein the at least one characteristic includes a friction coefficient of the terrain under the vehicle.

18. The remote vehicle of claim 14, wherein the processing device is further configured to:

detect additional information at the current location;

store the additional information in the characteristic digest; and associate the additional information with the current location.

19. The remote vehicle of claim 18, wherein the additional information includes short-range communication protocol information, the short-range communication protocol information being indicative of whether communication performed using a specific communication protocol can be performed at the current location.

20. The remote vehicle of claim 14, wherein the at least one characteristic includes at least one of a magnitude of a magnetic field detected at the current location, an amount of visible light detected at the current location, an amount of invisible light detected at the current location, an amount of sound detected at the current location, a temperature detected at the current location, or a humidity detected at the current location.

* * * * *